US012654456B2

(12) United States Patent
Jones et al.

(10) Patent No.: US 12,654,456 B2
(45) Date of Patent: Jun. 16, 2026

(54) THERMAL INKJET PRINTER DEVICE

(71) Applicants: ID Technology LLC, Ft. Worth, TX (US); MACSA ID, S.A., Barcelona (ES)

(72) Inventors: Allan Bradley Jones, Kennesaw, GA (US); Malcolm Eric Brown, Haslet, TX (US); Marc Soleda Alet, Santpedor (ES); Mark Bowden, Nokomis, FL (US)

(73) Assignee: ID TECHNOLOGY LLC, Fort Worth, TX (US)

( * ) Notice: Subject to any disclaimer, the term of this patent is extended or adjusted under 35 U.S.C. 154(b) by 142 days.

(21) Appl. No.: 18/625,970

(22) Filed: Apr. 3, 2024

(65) Prior Publication Data

US 2025/0313015 A1 Oct. 9, 2025

(51) Int. Cl.
*B41J 2/14* (2006.01)
*B41J 2/175* (2006.01)

(52) U.S. Cl.
CPC ........... *B41J 2/1752* (2013.01); *B41J 2/1433* (2013.01); *B41J 2/17526* (2013.01); *B41J 2/17543* (2013.01)

(58) Field of Classification Search
CPC ...... B41J 2/1433; B41J 2/16508; B41J 2/175; B41J 2/17503; B41J 2/17506; B41J 2/17509; B41J 2/1752; B41J 2/17526; B41J 2/17543
See application file for complete search history.

(56) References Cited

U.S. PATENT DOCUMENTS 4,907,018 A * 3/1990 Pinkerpell .............. B41J 2/1752 347/50
5,646,665 A * 7/1997 Swanson ................ B41J 2/1752 347/87
5,798,777 A * 8/1998 Yoshimura ........... B41J 2/16508 347/29
7,959,276 B2 * 6/2011 Muhl ..................... B41J 2/1752 347/87
8,366,253 B2 * 2/2013 Iwata ..................... B41J 2/1752 347/108
9,132,654 B1 * 9/2015 Dryer ..................... B41J 2/1753

OTHER PUBLICATIONS

ID Technology—CLEARMARK, Installation, Operation & User Manual, Jan. 2021, 116 pages.

* cited by examiner

*Primary Examiner* — Anh T Vo
(74) *Attorney, Agent, or Firm* — THOMPSON HINE LLP

(57) ABSTRACT

A thermal inkjet printer device includes a housing defining a cartridge receiving slot with a cartridge install/removal opening, a nozzle plate opening, and a plurality of control pins along a bottom portion of the slot and spaced rearwardly of the nozzle plate opening. The cartridge receiving slot includes a forward upper side, spaced rearwardly of the nozzle plate opening, and a rear side that is curved such that, upon insertion of a thermal inkjet cartridge through the install/removal opening, a forward portion of the thermal inkjet cartridge engages on the forward upper side causing the thermal inkjet cartridge to rotate such that that a rear portion of the thermal inkjet cartridge engages the rear side of the slot, pushing a nose portion of the thermal inkjet cartridge forward toward the nozzle plate opening as the thermal inkjet cartridge rotates downward and moves further down into the slot.

20 Claims, 13 Drawing Sheets

13
13a
13c
19
70
70
19

19
13
13d
13e
13b
19

13a
19
13
13d
19

13
13a
19
13d
13e
13b
19
13f
82

THERMAL INKJET PRINTER DEVICE

TECHNICAL FIELD

The present application relates generally to thermal inkjet printers and, more particularly, to thermal inkjet printers that utilize replaceable cartridges.

BACKGROUND

Thermal inkjet printers that utilize replaceable cartridges are known, in which the cartridges have control terminals on one edge of the cartridge, a nozzle plate on an adjacent edge of the cartridge, and a communication ribbon running externally along the cassette, and around a corner region of the cassette, from the terminals to the nozzle plate. The printer includes a cartridge slot with a set of control pins (commonly referred to as pogo pins) that will engage with the cartridge control terminals when the cartridge is loaded into the slot, such that the printer can send control signals to the cartridge and drive the nozzles as needed for desired printing. In existing printers of this type, the installation sequence of the cartridge permits the communication ribbon to slide or scrape over the printer control pins in the slot, which can lead to damage to the communication ribbon, resulting in the inability of the cartridge to print properly.

Accordingly, it would be desirable to provide a thermal inkjet printer that is capable of addressing the above issue and/or that has other desirable features.

SUMMARY

In one aspect, a thermal inkjet printer device includes a housing defining a cartridge receiving slot with a cartridge install/removal opening, a nozzle plate opening, and a plurality of control pins along a bottom portion of the slot and spaced rearwardly of the nozzle plate opening. The cartridge receiving slot includes a forward upper side, spaced rearwardly of the nozzle plate opening, and a rear side that is curved such that, upon insertion of a thermal inkjet cartridge through the install/removal opening, a forward portion of the thermal inkjet cartridge engages on the forward upper side causing the thermal inkjet cartridge to rotate such that that a rear portion of the thermal inkjet cartridge engages the rear side of the slot, pushing a nose portion of the thermal inkjet cartridge forward toward the nozzle plate opening as the thermal inkjet cartridge rotates downward and moves further down into the slot.

In another aspect, a thermal inkjet printer device for use with an inkjet cartridge having a cartridge nose portion with an associated nozzle plate for ejecting ink is provided. The thermal inkjet printer device includes a housing defining a cartridge receiving slot with an upper cartridge install/removal opening, opposed first and second lateral sides, a rear side, a bottom side and a forward side. The forward side of the slot includes a lower section and an upper section, wherein the lower section includes a nozzle plate opening for enabling the nozzle plate to be exposed externally of the housing for printing, wherein the upper section includes a planar surface portion facing the rear side and extending downwardly from the upper cartridge install/removal opening. The bottom side of the slot includes a plurality of upwardly extending control pins spaced rearwardly of the nozzle plate opening. The rear side comprises a concave surface portion facing the forward side for guiding installation of the cartridge as it is rotated down into the slot.

In a further aspect, a thermal inkjet cartridge includes a housing, and an adhesive label applied to the housing. The label includes a first adhesive face end region connected to a first external portion of the housing, a second adhesive face end region connected to a second external portion of the housing, and a third intermediate adhesive face region adhered to a fourth intermediate adhesive face region to form a pull tab that protrudes from the housing to facilitate removal of the thermal inkjet cartridge from a cartridge receiving slot of a printer device.

The details of one or more embodiments are set forth in the accompanying drawings and the description below. Other features, objects, and advantages will be apparent from the description and drawings, and from the claims.

DETAILED DESCRIPTION

Figure 1:
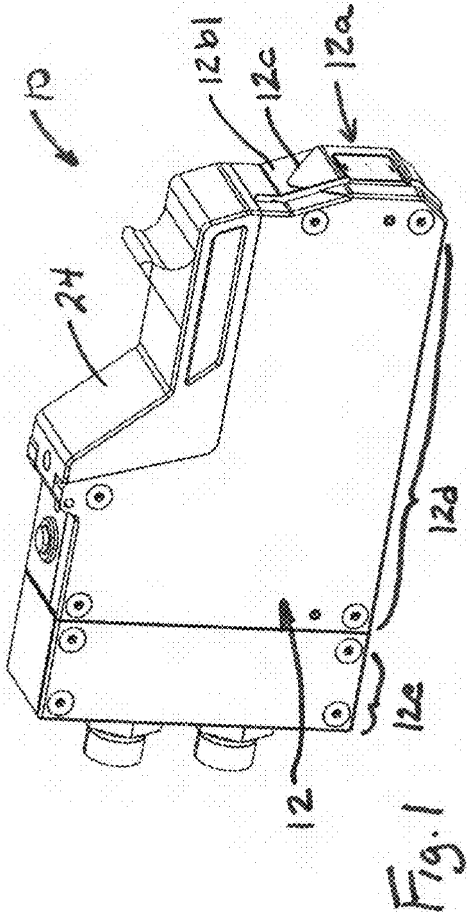
FIGS. 1-2 show perspective views of a printer device, in the form of a printhead.
Figure 2:
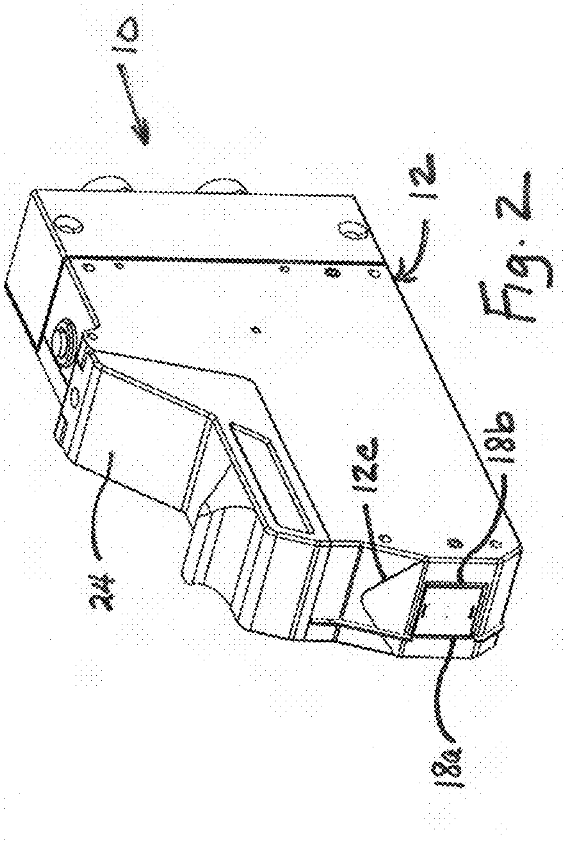
Figure 3:
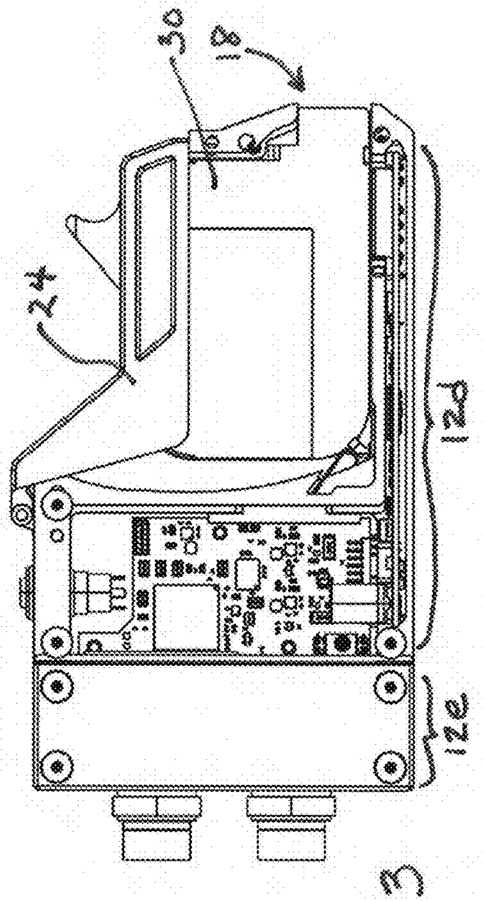
FIGS. 3 and 4 show side elevations with a housing sidewall hidden.
Figure 4:
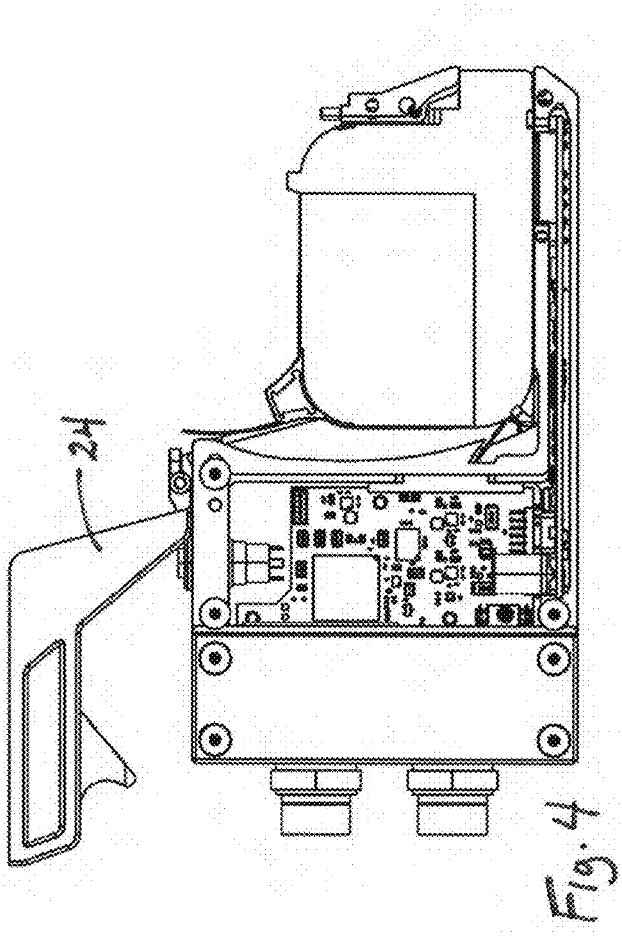
Figure 5:
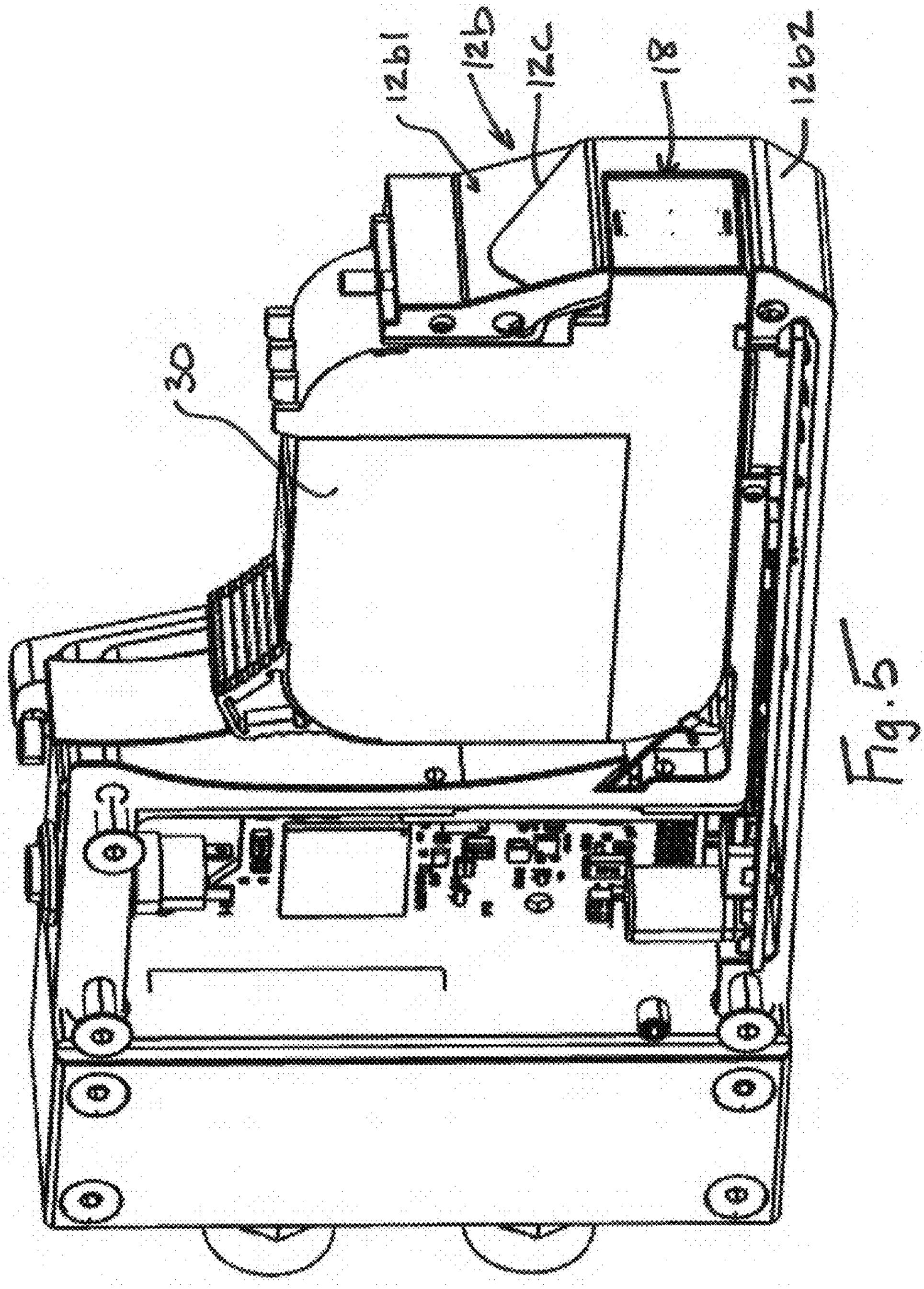
FIG. 5 shows a perspective view with housing sidewall hidden.
Figure 6:
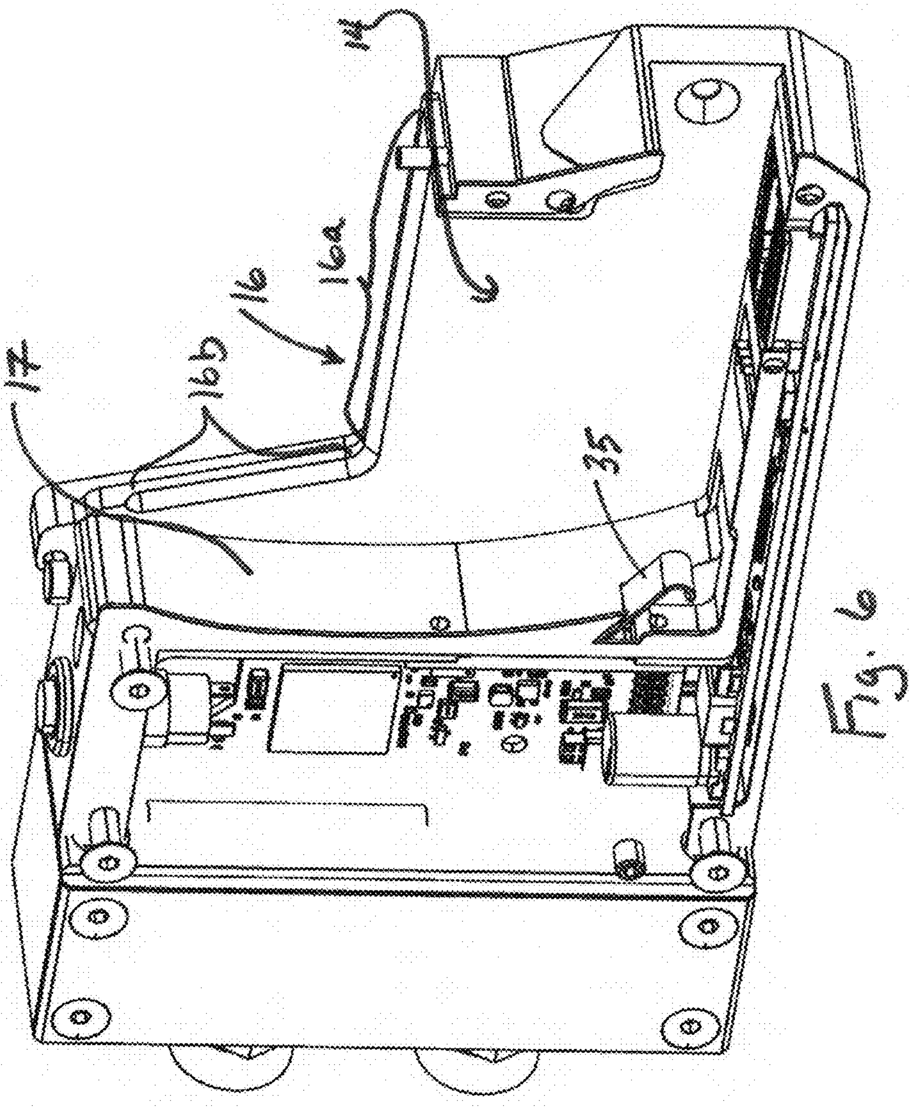
FIGS. 6-8 show perspective views with housing sidewall hidden and cartridge removed.
Figure 7:
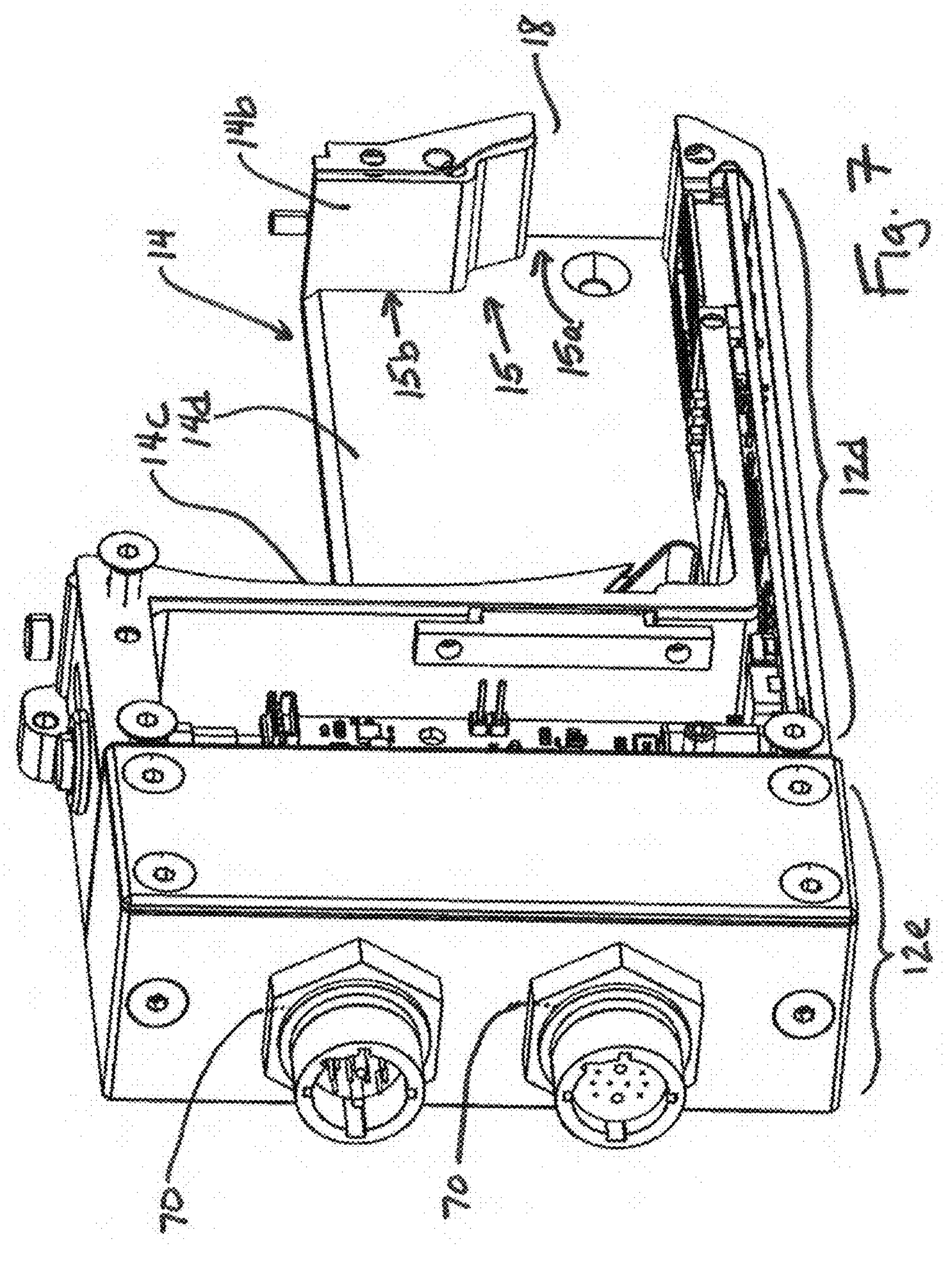
Figure 8:
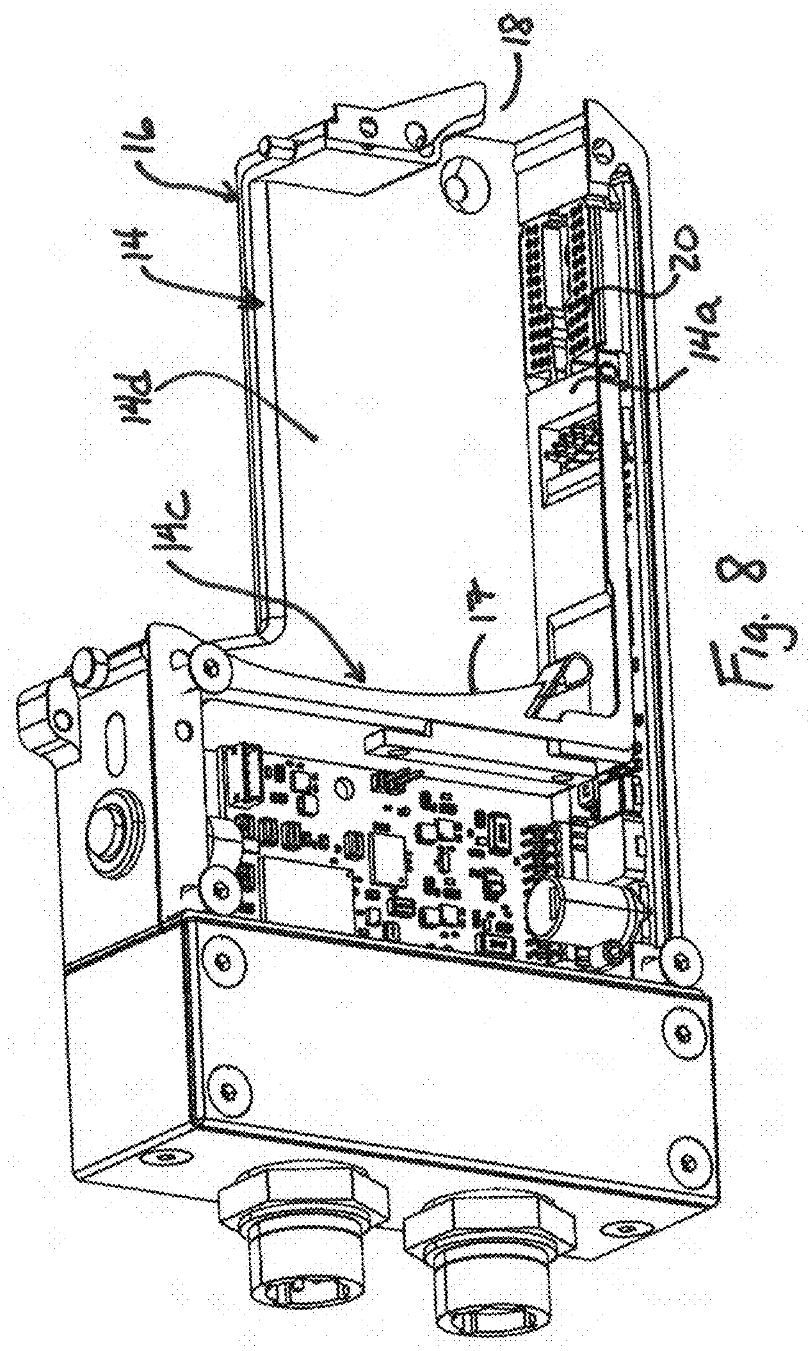
Figure 10:
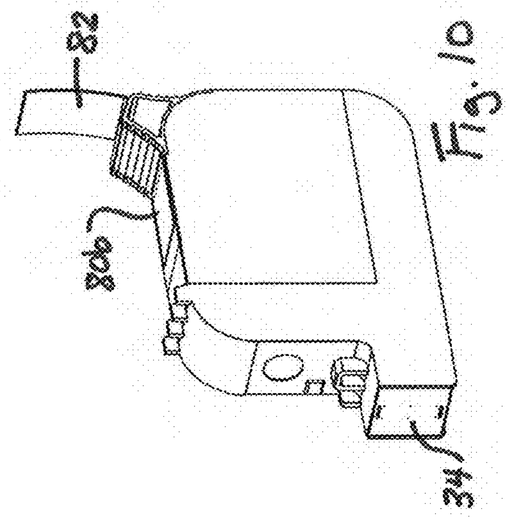
FIG. 9-12 show perspective views of an inkjet cartridge.
Figure 12:
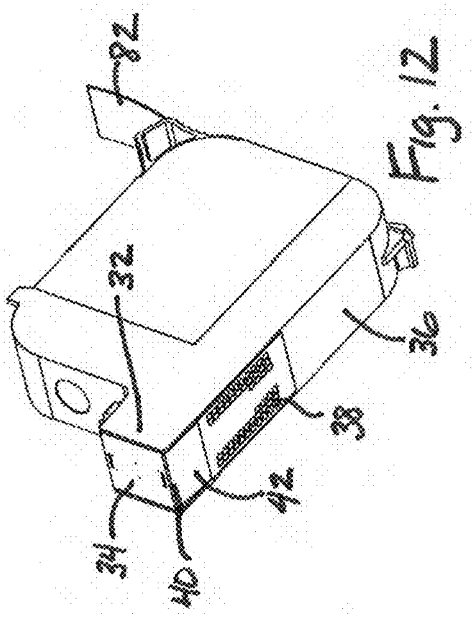
Figure 9:
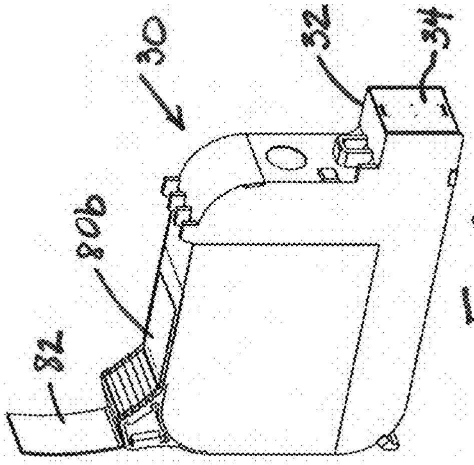
Figure 11:
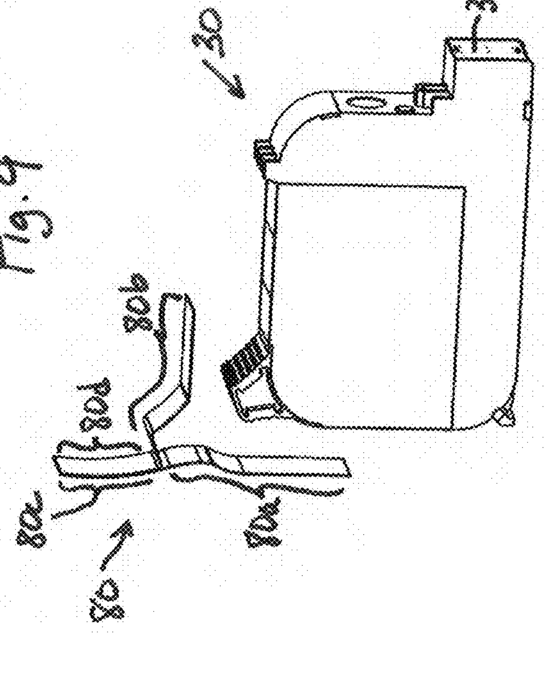
Figure 13A:
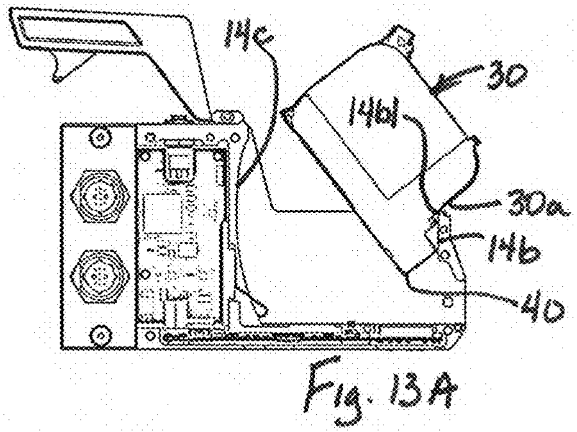
FIGS. 13A-13F show an install sequence for an inkjet cartridge.
Figure 13B:
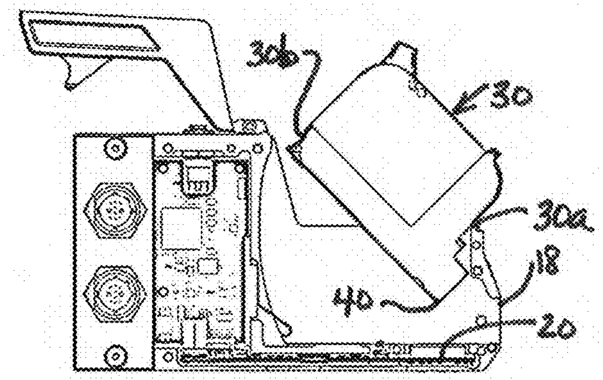
Figure 13C:
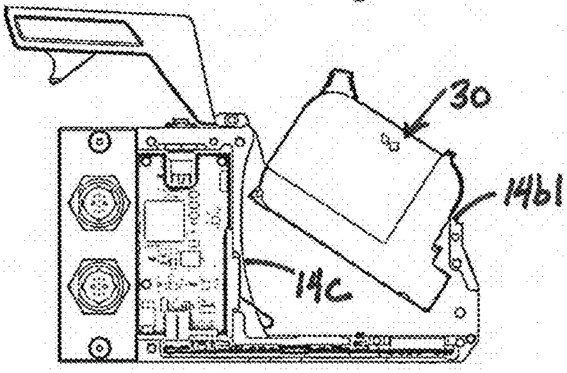
Figure 13D:
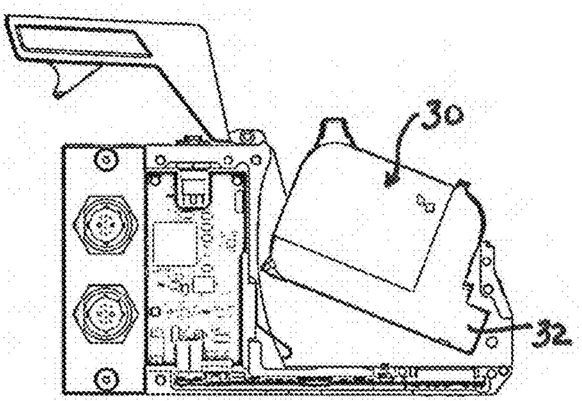
Figure 13E:
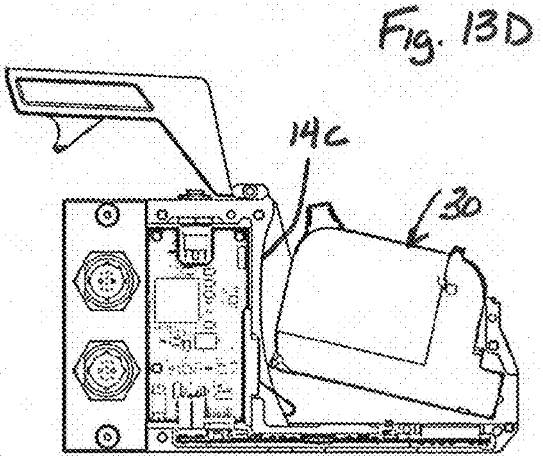
Figure 13F:
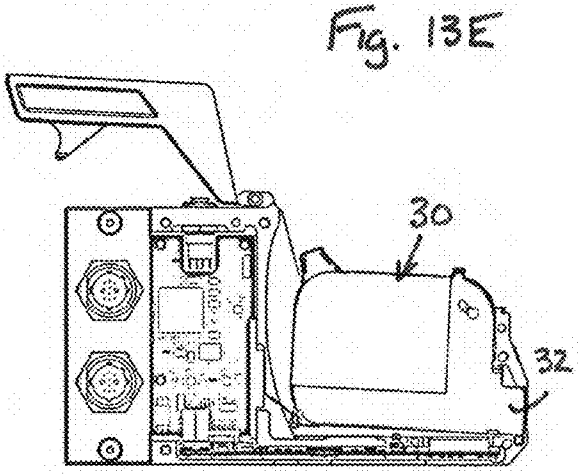

Referring to FIGS. 1-18C, a thermal inkjet printer device 10, in the form of a printhead, includes a housing 12 defining a cartridge receiving slot 14 with an upper cartridge install/removal opening 16 and a nozzle plate opening 18 at a forward end of the housing. A plurality of control pins 20 are located along a bottom side or portion 14*a* of the slot 14 and are spaced rearwardly of the nozzle plate opening 18.

The device 10 is configured for use with a thermal inkjet printer cartridge 30 that includes a nose portion 32 on which a nozzle plate 34 with ink ejecting nozzles is located, and a bottom edge 36 with a set of communication terminals 38 for engaging with the control pins 20 of the slot. A bottom forward corner segment 40 of the cartridge interconnects the bottom edge 36 and the front of the nose portion 32, and a communication ribbon 42 runs from the communication terminals 38 around the bottom forward corner segment 40 to the nozzle region. The communication ribbon 42 includes conductors that connect with the nozzle plate 34 in a manner to enable controlled ejection of ink from the nozzles of the nozzle plate.

The cartridge receiving slot 14 includes a forward upper side section 14*b* spaced rearwardly of the nozzle plate opening 18 and a rear side 14*c* that is curved, in a concave manner facing forward. As seen in the sequence of FIGS. 13A-13F, upon insertion of the thermal inkjet cartridge 30 through the install/removal opening 16, a forward portion 30*a* of the thermal inkjet cartridge engages on the top 14*b*1 of the forward upper side section 14*b*, which top 14*b*1 acts as a pivot point, causing the thermal inkjet cartridge 30 to rotate such that that a rear portion 30*b* of the thermal inkjet cartridge 30 engages the rear side 14*c* of the slot 14, with continued rotation of the cartridge 30 about the pivot point 14*b*1 pushing the nose portion 32 of the thermal inkjet cartridge 30 forward toward the nozzle plate opening 18 as the thermal inkjet cartridge 30 rotates downward and moves further down into the slot 14. Notably, the forward upper side top 14*b*1 and rear side 14*c* of the cartridge receiving slot 14 are cooperatively shaped and configured such that, during installation of the thermal inkjet cartridge 30, the bottom forward corner segment 40 of the thermal inkjet cartridge 30 is pushed forwardly of the control pins 20 in the slot 14 while the bottom forward corner segment 40 is still spaced upwardly away from the control pins 20. This assures that the portion of the ribbon 42 extending around the corner segment 40 is not damaged by scraping against/over the control pins 20. A plate spring member 35 may be positioned to interact with the rear portion of the cartridge to urge the cartridge forward and may interact with a corner projection on the bottom rear of the cassette to releasably retain the cartridge in the slot.

Figure 14B:
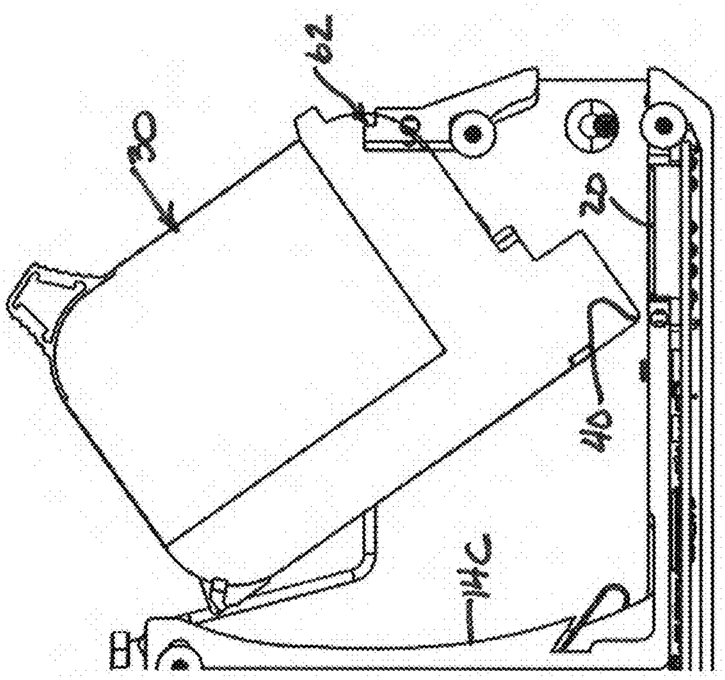
FIGS. 14A-14B show cassette install position limiting characteristics of the device.
Figure 14A:
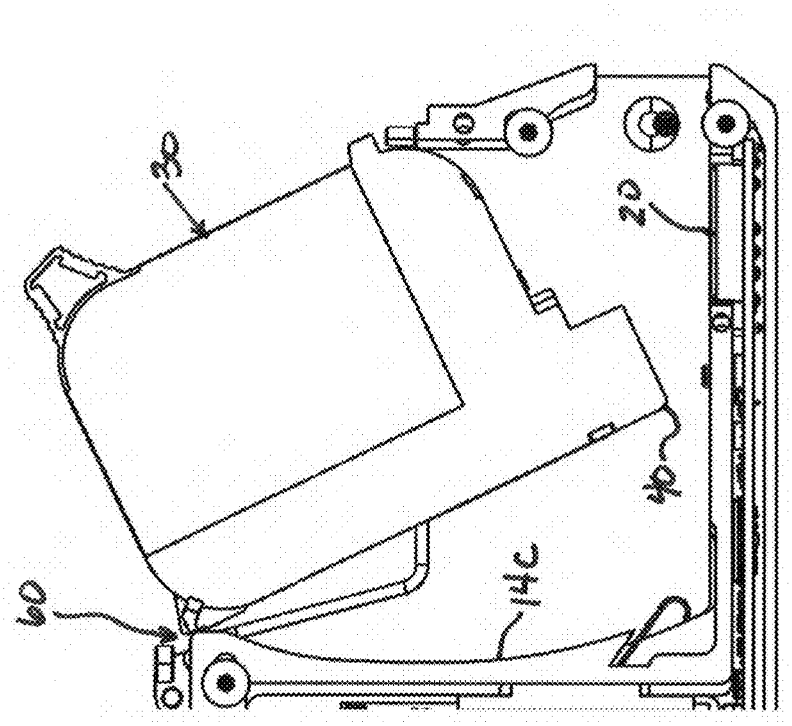
Figure 15C:
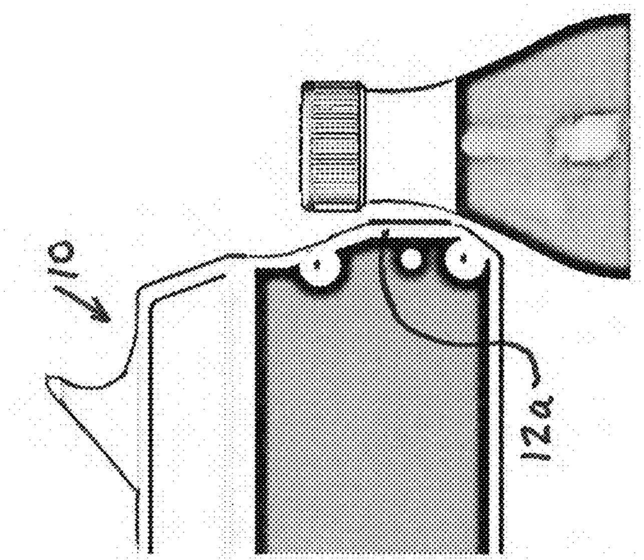
FIGS. 15A-15C show exemplary printing.
Figure 15B:
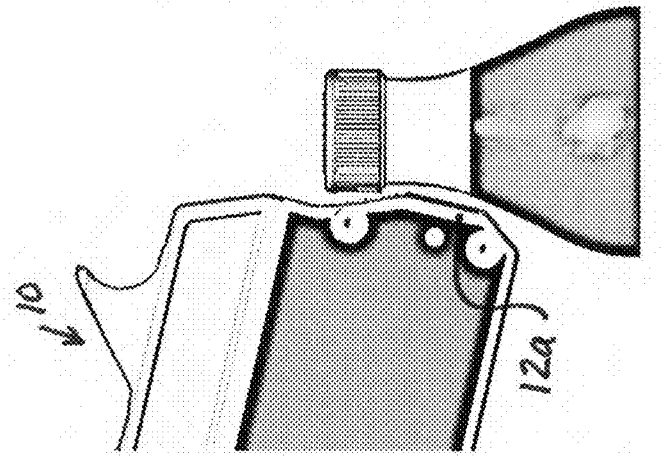
Figure 15A:
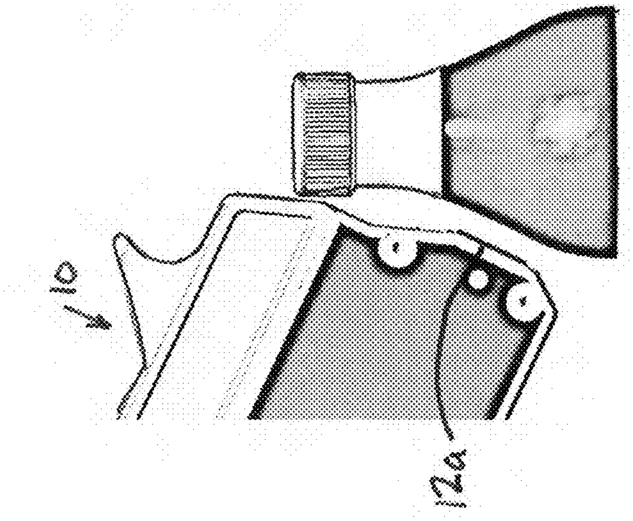
Figure 16B:
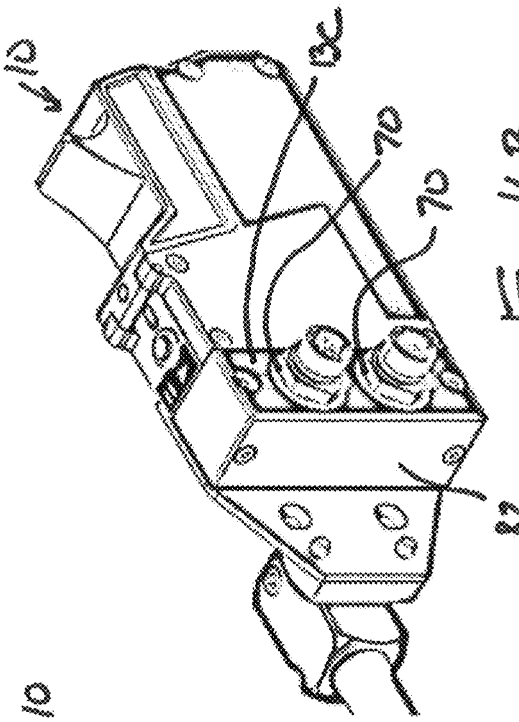
FIGS. 16A-16C show various electrical connector configurations of the device.
Figure 16A:
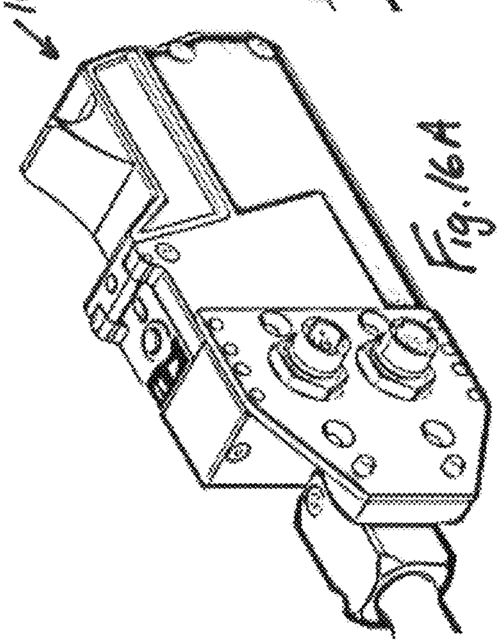
Figure 16C:
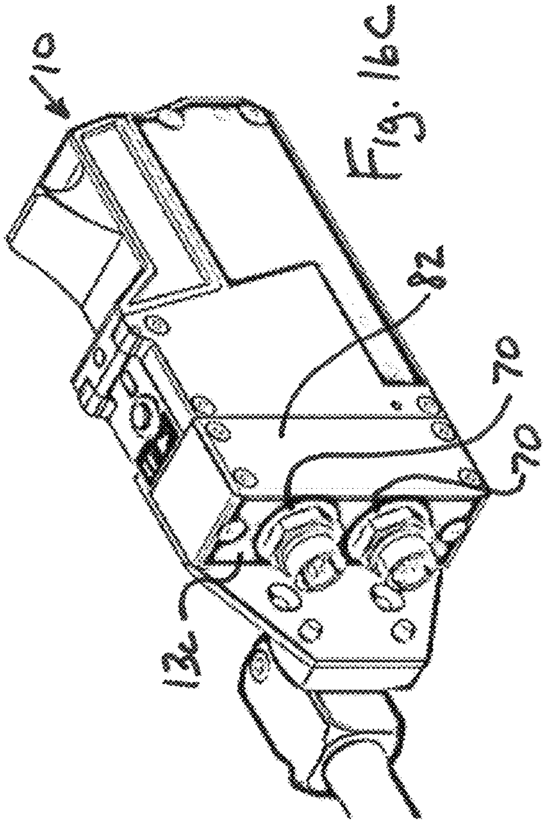
Figures 17A, 17B, 17C, 17D:
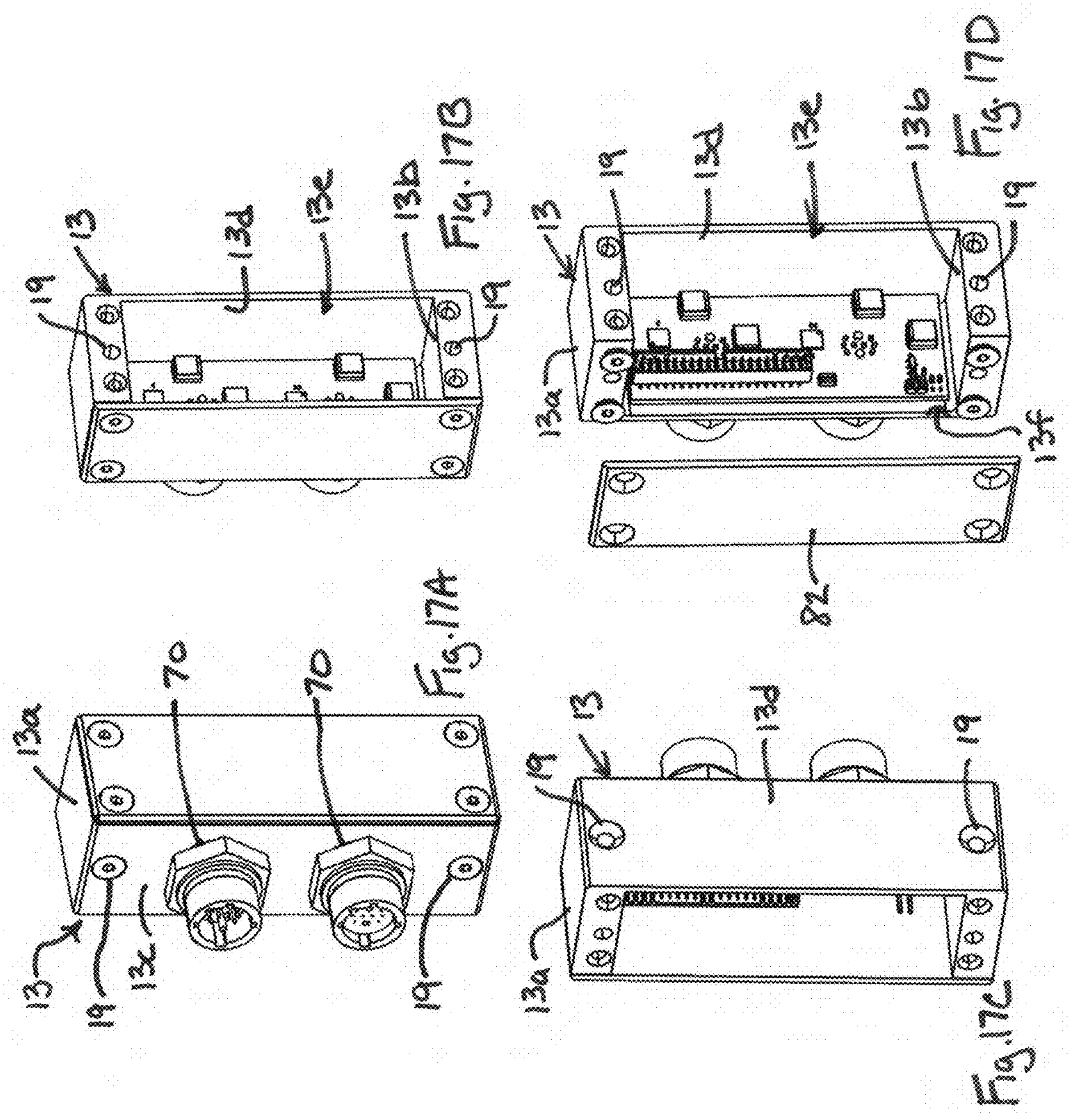
FIGS. 17A-17D show an electrical connector section of the device housing.

In implementations, the relative shape and size of the cartridge 30 and the slot 14 prevents the cartridge 30 from being pushed down into the slot 14 in a manner that would cause the forward corner segment 40 to engage the control pins 20, as represented by the blocking interference region 60 and the overlap region 62 shown in FIGS. 14A-14B. It is recognized that the cassette position of FIG. 14B is not even possible.

The cartridge receiving slot 14 has opposed lateral sides 14*d*, rear side 14*c*, bottom side 14*a* and a forward side 15, with the forward side 15 including a lower section 15*a* and an upper section 15*b*. The lower section 15*a* includes the nozzle plate opening 18. The upper section 15*a* includes forward upper side section 14*b*, in the form of a planar surface portion, facing the rear side 14*c* and extending downwardly from the upper cartridge install/removal opening. The rear side 14*c* includes concave surface portion or wall 17 facing the forward side for guiding installation of the cartridge 30 as it is rotated down into the slot. The concave surface portion 17 extends over a majority of a height of the cartridge receiving slot 14. Here, the cartridge install/removal opening 16 is defined by a forward portion 16*a* and a rearward portion 16*b* that extends upwardly and rearwardly from the forward portion 16*a*. The concave surface portion 17 extends upward along the rear side of the cartridge install/removal opening to a location higher than the upper edge of the forward portion 16*a* of the cartridge install/removal opening. Here, a slot cover 24 is pivotably mounted on the cartridge housing 12 for rotation between a position that covers both the forward portion and the rearward portion of the cartridge insertion/removal opening (e.g., per FIG. 3) and a position in which both the forward portion and the rearward portion of the cartridge insertion/removal opening are uncovered (e.g., per FIG. 4).

Notably, the nozzle plate opening 18 is located in a forwardly protruding cartridge nose portion 12*a* of the housing 12, such that a forward facing external surface portion 12*b* of the housing angles rearwardly away from the nozzle plate opening in both a region 12*b*1 above the nozzle plate opening 18 and a region 12*b*2 below the nozzle plate opening 18. As per FIGS. 15A-15C, this configuration facilitates positioning of the nozzle region of the device in tight, angular spaces for printing.

In the region 12*b*1 above the nozzle plate opening, the external surface portion of the housing includes a drainage ledge 12*c* oriented for directing moisture on the external surface portion 12*b*1 away from the nozzle plate opening 18. Here, the drainage ledge 12*c* is formed as a V-shape, with an apex of the V-shape oriented above the nozzle plate opening 18 and legs of the V-shape extending downwardly and laterally beyond locations of opposite lateral sides 18*a*, 18*b* of the nozzle plate opening 18. The drainage ledge directs moisture away from the nozzle plate opening and nozzle plate of an inserted cassette.

The housing 12 includes a main section 12*d* and an electrical connector section 12*e*. The main section 12*d* includes the cartridge receiving slot 14, and the electrical connector section 12*e* includes electrical connector opening(s) 70. Per FIGS. 16A-16C, the electrical connector section 12*e* is connectable to the main section 12 in different configurations. In one configuration, per FIG. 16C, the electrical connector opening(s) 70 face rearwardly and, in another configuration, per FIGS. 16A-16B, the electrical connector opening(s) 70 face sidewardly. To achieve this variability, here, per FIGS. 17A-17D, the electrical connector section 12*e* comprises a six-sided box-shaped module 13, with a fixed upper side wall 13*a*, a fixed lower side wall 13*b*, a fixed lateral side wall 13*c*, a fixed lateral side wall 13*d*, an open lateral side 13*e* and an open lateral side 13*f*. The electrical connector opening(s) 70 is/are located in the fixed lateral side wall 13*c*, and the open lateral side 13*e* is located opposite the fixed lateral side wall 13*c*. The open lateral side 13*f* runs between the fixed lateral side wall 13*c* and the open lateral side 13*e*. A removable cover panel 82 is connectable, via fasteners, to either the open lateral side 13*e* or the open lateral side 13*f* to cover the opening as needed depending upon how the module 13 is connected to the main section 12*d* of the housing 12. Central fastener openings 19 in both fixed lateral side walls 13*c* and 13*d* enable engagement of the module 13 with the main section 12*d* of the housing in either of the orientations (e.g., per FIG. 16B or FIG. 16C).

Figure 18B:
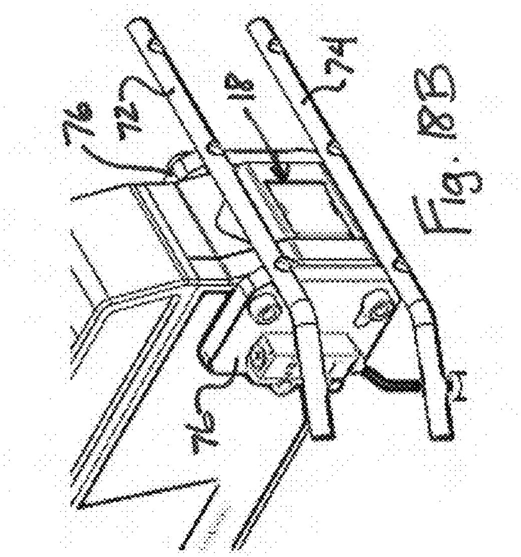
FIGS. 18A-18C show guide bar configurations for the device.
Figure 18A:
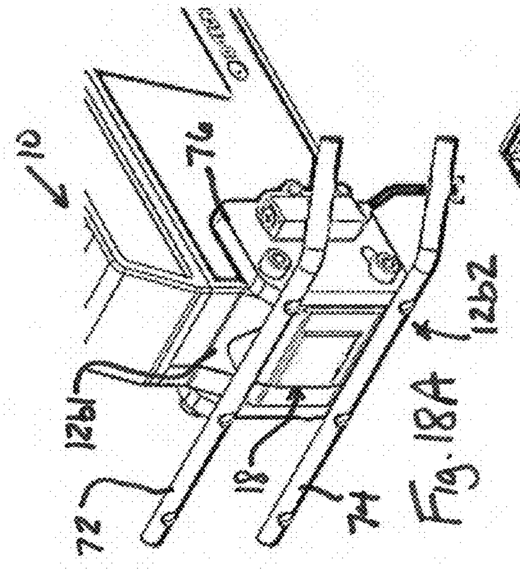
Figure 18C:
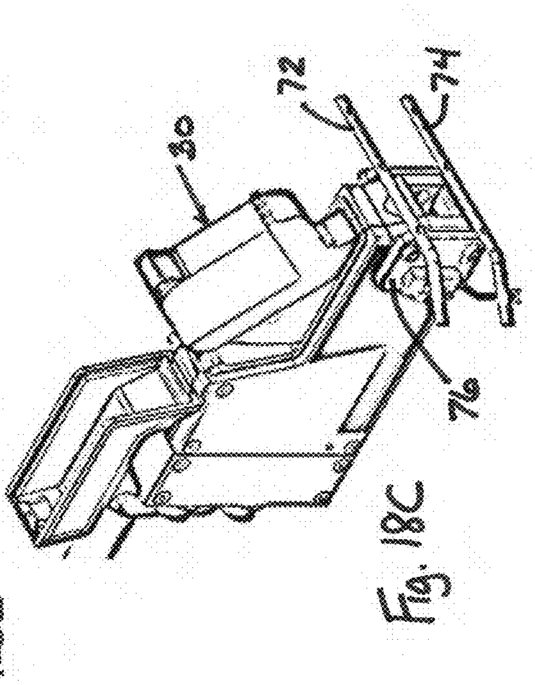

In implementations, per FIGS. 18A-18C, the device 10 includes a guide bar 72 removably attached to the housing and running at least partly in the region 12*b*1 above the nozzle plate opening 18, and a guide bar 74 removably attached to the housing and running at least partly in the region 12*b*2 below the nozzle plate opening 18. Here, the guide bars 72, 74 are connected to side plates 76 that are, in turn, fastened to the exterior sides of the housing 12. Various configurations (orientations, shapes and lengths) of the guide bars 72, 74 are possible.

To facilitate removal of the cassette 30 from the slot 14, in embodiments, per FIGS. 9-12, the cartridge 30 includes an adhesive label 80 applied thereto (where the label may includes printed indicia at its externally facing non-adhesive surface). The label 80 includes a first adhesive face end region 80*a* connected to a first portion of the housing 12, a second adhesive face end region 80*b* connected to a second portion of the housing 12, and a third intermediate adhesive face region 80*c* adhered to a fourth intermediate adhesive face region 80*d* to form a pull tab 82 that protrudes upwardly from the thermal inkjet cartridge 30 to facilitate the removal of the thermal inkjet cartridge from the cartridge receiving slot by pulling upward on the pull tab 82. Here, the first external surface portion of the housing 12 is an upwardly extending portion of a rear edge of the cartridge, and the second external surface portion of the housing 12 is a forwardly extending portion of an upper edge of the cartridge, and the pull tab 82 extends from a rear upper corner region of the housing where the rear edge and the upper edge meet.

It is to be clearly understood that the above description is intended by way of illustration and example only and is not intended to be taken by way of limitation. Variations are possible.

The invention claimed is:

1. A thermal inkjet printer device, comprising:

a housing defining a cartridge receiving slot with a cartridge install/removal opening, a forward ink eject side, a rear side opposite the forward ink eject side, and a bottom control pin side opposite the cartridge install/removal opening and running between the forward ink eject side and the rear side, wherein the forward ink eject side and the rear side each run from the cartridge install/removal opening toward the bottom control pin side, a nozzle plate opening located at the forward ink eject side, and a plurality of control pins along the bottom control pin side and spaced rearwardly of the nozzle plate opening;

wherein the cartridge receiving slot includes a forward upper side section spaced rearwardly of the nozzle plate opening and the rear side is curved such that, upon insertion of a thermal inkjet cartridge through the install/removal opening, a forward portion of the thermal inkjet cartridge engages on the forward upper side section causing the thermal inkjet cartridge to rotate such that that a rear portion of the thermal inkjet cartridge engages the rear side, pushing a nose portion of the thermal inkjet cartridge forward toward the nozzle plate opening as the thermal inkjet cartridge rotates downward and moves further down into the slot.

2. The thermal inkjet printer device of claim 1, wherein:

the thermal inkjet cartridge includes a bottom edge with a set of communication terminals, a nozzle region on a front of the nose portion, a bottom forward corner segment interconnecting the bottom edge and the front of the nose portion, and a communication ribbon running from the communication terminals around the bottom forward corner segment to the nozzle region;

the forward upper side section and rear side of the cartridge receiving slot are cooperatively shaped and configured such that, during installation of the thermal inkjet cartridge, the bottom forward corner segment of the thermal inkjet cartridge is pushed forwardly of the control pins while the bottom forward corner segment is spaced upwardly away from the control pins.

3. The thermal inkjet printer device of claim 1, wherein the housing includes a main section and an electrical connector section, wherein the main section includes the cartridge receiving slot, wherein the electrical connector section includes at least one electrical connector opening, wherein the electrical connector section is connectable to the main section in at least a first configuration and a second configuration, wherein, in the first configuration, the electrical connector opening faces rearwardly and, in the second configuration, the electrical connector opening faces sidewardly.

4. The thermal inkjet printer device of claim 3, wherein the electrical connector section comprises a six-sided module, with a fixed upper side wall, a fixed lower side wall, a first fixed lateral side, a second fixed lateral side wall, a third open lateral side and a fourth open lateral side, wherein the electrical connector opening is located in the first fixed lateral side, wherein the third open lateral side is located opposite the first fixed lateral side, wherein the fourth open lateral side runs between the first fixed lateral side and the third open lateral side.

5. The thermal inkjet printer device of claim 4, wherein the electrical connector section further comprises a cover panel connectable to either the third open lateral side or the fourth open lateral side.

6. The thermal inkjet printer device of claim 1, wherein the nozzle plate opening is located in a forwardly protruding cartridge nose portion of the housing such that the housing angles rearwardly away from the nozzle plate opening in both a region above the nozzle plate opening and a region below the nozzle plate opening.

7. The thermal inkjet printer of claim 6, further comprising a first guide bar removably attached to the housing and running at least partly in the region above the nozzle plate opening, and a second guide bar removably attached to the housing and running at least partly in the region below the nozzle plate opening.

8. The thermal inkjet printer device of claim 1, wherein the housing includes a slot cover pivotably mounted for rotation between a first position that covers the cartridge insertion/removal opening and a second position in which the cartridge insertion/removal opening is uncovered.

9. The thermal inkjet printer device of claim 1, wherein the thermal inkjet cartridge includes an adhesive label applied thereto, the label including a first adhesive face end region connected to a first portion of the housing, a second adhesive face end region connected to a second portion of the housing, and a third intermediate adhesive face region adhered to a fourth intermediate adhesive face region to form a pull tab that protrudes upwardly from the thermal inkjet cartridge to facilitate removal of the thermal inkjet cartridge from the cartridge receiving slot by pulling upward on the pull tab.

10. A thermal inkjet printer device, comprising:

a housing defining a cartridge receiving slot with an upper cartridge install/removal opening, opposed first and second lateral sides, a rear side, a forward ink eject side, and a bottom control pin side opposite the upper cartridge install/removal opening and extending from the first side toward the second side, wherein the forward ink eject side and the rear side each run from the cartridge install/removal opening toward the bottom control pin side;

wherein the thermal inkjet printer device is configured for use with an inkjet cartridge having a cartridge nose portion with an associated nozzle plate for ejecting ink;

wherein the forward ink eject side of the slot includes a lower section and an upper section, wherein the lower section includes a nozzle plate opening for enabling the nozzle plate to be exposed externally of the housing for printing, wherein the upper section includes a planar surface portion facing the rear side and extending downwardly from the upper cartridge install/removal opening;

wherein the bottom control pin side of the slot includes a plurality of upwardly extending control pins spaced rearwardly of the nozzle plate opening;

wherein the rear side comprises a concave surface portion facing the forward ink eject side for guiding installation of the cartridge as the cartridge is rotated down into the slot.

11. The thermal inkjet printer device of claim 10, wherein the concave surface portion extends over a majority of a height of the cartridge receiving slot.

12. The thermal inkjet printer device of claim 10, wherein the cartridge install/removal opening is defined by a forward portion and a rearward portion that extends upwardly from the forward portion, wherein the concave surface portion extends upward along the rearward portion of the cartridge install/removal opening and beyond an upper edge of the forward portion of the cartridge install/removal opening.

13. The thermal inkjet printer device of claim 10, further comprising a slot cover pivotably mounted on the housing for rotation between a first position that covers both the forward portion and the rearward portion of the cartridge insertion/removal opening and a second position in which both the forward portion and the rearward portion of the cartridge insertion/removal opening are uncovered.

14. The thermal inkjet printer device of claim 10, wherein the nozzle plate opening is located in a forwardly protruding cartridge nose portion of the housing, such that an external surface portion of the housing angles rearwardly away from the nozzle plate opening in both a region above the nozzle plate opening and a region below the nozzle plate opening.

15. The thermal inkjet printer device of claim 14, wherein, in the region above the nozzle plate opening, the external surface portion of the housing includes a drainage ledge oriented for directing moisture on the external surface portion away from the nozzle plate opening.

16. The thermal inkjet printer device of claim 15, wherein the drainage ledge forms a V-shape, with an apex of the V-shape oriented above the nozzle plate opening and legs of the V-shape extending downwardly and laterally beyond locations of opposite lateral sides of the nozzle plate opening.

17. A thermal inkjet cartridge, comprising a housing;

an adhesive label applied to the housing, the label including a first adhesive face end region connected to a first external portion of the housing, a second adhesive face end region connected to a second external portion of the housing, and a third intermediate adhesive face region adhered to a fourth intermediate adhesive face region to form a pull tab that protrudes from the housing to facilitate removal of the thermal inkjet cartridge from a cartridge receiving slot of a printer device.

18. The thermal inkjet cartridge of claim 17, wherein the first external surface portion of the housing comprises an upwardly extending portion of a rear sidewall of the housing, wherein the second external surface portion of the housing comprises a forwardly extending portion of an upper sidewall of the housing, and the pull tab extends from a corner region of the housing where the rear sidewall and the upper sidewall meet.

19. A thermal inkjet printer device, comprising:

a housing defining a cartridge receiving slot with a cartridge install/removal opening, a nozzle plate opening, and a plurality of control pins along a bottom portion of the slot and spaced rearwardly of the nozzle plate opening;

wherein the nozzle plate opening is located in a forwardly protruding cartridge nose portion of the housing such that the housing angles rearwardly away from the nozzle plate opening in both a region above the nozzle plate opening and a region below the nozzle plate opening;

wherein a first guide is bar removably attached to the housing and runs at least partly in the region above the nozzle plate opening, and a second guide bar is removably attached to the housing and runs at least partly in the region below the nozzle plate opening.

20. A thermal inkjet printer device, comprising:

a housing defining a cartridge receiving slot with an upper cartridge install/removal opening, opposed first and second lateral sides, a rear side, a bottom side and a forward side;

wherein the thermal inkjet printer device is configured for use with an inkjet cartridge having a cartridge nose portion with an associated nozzle plate for ejecting ink;

wherein the forward side of the slot includes a lower section and an upper section, wherein the lower section includes a nozzle plate opening for enabling the nozzle plate to be exposed externally of the housing for printing;

wherein the nozzle plate opening is located in a forwardly protruding cartridge nose portion of the housing, such that an external surface portion of the housing angles rearwardly away from the nozzle plate opening in a region above the nozzle plate opening;

wherein, in the region above the nozzle plate opening, the external surface portion of the housing includes a drainage ledge oriented for directing moisture on the external surface portion away from the nozzle plate opening.

* * * * *